(12) United States Patent
Essbuechl-Srb

(10) Patent No.: US 12,104,692 B2
(45) Date of Patent: Oct. 1, 2024

(54) METHOD FOR THE DYNAMICALLY EXPANDING PLAY CORRECTION OF A SYSTEM AFFECTED BY EXTERNAL SOURCES

(71) Applicant: MAGNA Powertrain GmbH & Co KG, Lannach (AT)

(72) Inventor: Oliver Essbuechl-Srb, Gratwein-Strassengel (AT)

(73) Assignee: MAGNA Powertrain GmbH & Co KG, Lannach (AT)

( * ) Notice: Subject to any disclaimer, the term of this patent is extended or adjusted under 35 U.S.C. 154(b) by 0 days.

(21) Appl. No.: 18/504,242

(22) Filed: Nov. 8, 2023

(65) Prior Publication Data
US 2024/0151306 A1    May 9, 2024

(30) Foreign Application Priority Data

Nov. 9, 2022  (DE) .......................... 102022211869.3

(51) Int. Cl.
| | | |
|---|---|---|
| *F16H 61/00* | (2006.01) | |
| *F16H 61/10* | (2006.01) | |
| *F16H 61/28* | (2006.01) | |
| *F16H 61/32* | (2006.01) | |

(52) U.S. Cl.
CPC ..... *F16H 61/10* (2013.01); *F16H 2061/0087* (2013.01); *F16H 2061/0093* (2013.01); *F16H 2061/283* (2013.01); *F16H 61/32* (2013.01); *F16H 2342/02* (2013.01)

(58) Field of Classification Search
CPC .. F16H 61/10; F16H 61/32; F16H 2061/0087; F16H 2061/0093; F16H 2061/283; F16H 2342/02
See application file for complete search history.

(56) References Cited

U.S. PATENT DOCUMENTS

2016/0230887 A1    8/2016  Park

FOREIGN PATENT DOCUMENTS

| DE | 102007057203 B4 | | 7/2020 |
|---|---|---|---|
| DE | 102021204859 A1 | | 11/2022 |
| JP | H112322 A | * | 1/1999 |
| JP | 2006112489 A | * | 4/2006 |
| JP | WO2005057051 A1 | * | 7/2007 |

* cited by examiner

*Primary Examiner* — Justin Holmes
(74) *Attorney, Agent, or Firm* — Dickinson Wright PLLC

(57) ABSTRACT

A method for the dynamically expanding play correction according to a method for hysteresis compensation for an actuator and for a shift fork which is movable by this actuator via an electric motor having a rotor and a stator and which guides a gearshift sleeve, by means of a cellular automaton, wherein a torque ripple of the actuator and a mechanical displacement of the gearshift sleeve are compensated independently of one another or in combination by means of a learning algorithm.

7 Claims, 4 Drawing Sheets

| Status | phiTarget | signBL |
|---|---|---|
| Coupling | phiCoup | +1 |
| ForceFree Coupled | phiCoup | 0 |
| Decoupling | phiDeCoup | -1 |
| ForceFree Decoupled | phiDeCoup | 0 |
| | | |

METHOD FOR THE DYNAMICALLY EXPANDING PLAY CORRECTION OF A SYSTEM AFFECTED BY EXTERNAL SOURCES

CROSS-REFERENCE TO RELATED APPLICATIONS

This application claims priority to German Application No. DE 102022211869.3 filed on Nov. 9, 2022. The entire disclosure of the above application is incorporated herein by reference.

FIELD OF THE INVENTION

The present invention relates to a method for the dynamically expanding play correction according to a method for hysteresis compensation for an actuator and for a shift fork which is movable by the actuator via an electric motor having a rotor and a stator and which guides a gearshift sleeve, by means of a cellular automaton.

BACKGROUND INFORMATION

This section provides information related to the present disclosure which is not necessarily prior art.

Shift forks are largely produced without chip-removing machining by plate forming, for example, by means of punching, drawing or pressing or by combinations of these methods. For this reason, the shift forks formed from metal sheets can be cost-effectively manufactured, particularly in mass production, and are used to an increasing extent. Further features composed of steel can be easily mounted on the steel sheet by welding or by means of other connection types. Fastening the sliding block on the steel sheet of the shift fork is complicated, however, because the sliding block on such shift forks should be composed of material that facilitates sliding and not of steel, in order to achieve the greatest self-lubricating running characteristics possible and a high wear resistance on the contact surface of the shift fork with the gearshift sleeve. According to the related art, materials such as, for example, plastic or brass, are intended at least for the sliding block.

A shift fork is moved via an actuator. Actuators generally have hysteresis in their motion sequence. This means that the actuator moves from a first state into a second state, for example, in the presence of a control signal. If the control signal is moved back to "zero," the actuator no longer completely returns to the first state, however.

DE 10 2007 057 203 B4 describes a method for engaging gears in an automatic transmission. A sensor is used to detect the position of the shift fork. The end positions are determined by means of a control loop. The method deals with securely engaging a gear, wherein the position of the teeth with respect to one another, namely of the gearshift sleeve with an idler gear and the associated fixed gear, is determined via a sensor.

Two threshold values are used for the closed-loop control which are determined from the axial displacement of the tooth of the gear wheel to be engaged in relation to the fixed gear. Both threshold values correspond to positions in which the teeth already overlap. In order to prevent the engagement of the gear from stopping, the position of the tooth to be engaged is queried in a time-dependent manner. The closed-loop control described in the document always queries the first threshold value S1 in order to then query the second threshold value S2 depending on the result. This is a control loop which is integrated into the activation of the actuator.

US 2016 0 230 887 A1 describes a method for determining a neutral position in a synchronization. For this purpose, a gearshift sleeve is moved in a first direction, then in a second direction, and then back into a neutral position, wherein the neutral position is calculated from the preceding movement and the distance between the end stops.

DE 10 2021 204 859 A1, which was subsequently published, describes a method in which the shift fork is moved via the actuator from a first shift position, namely a neutral position, into at least one second shift position, namely a gear position, and vice versa, wherein the position of the actuator is corrected when there is a shift request into the neutral position or into the gear position on the basis of a stored mechanical play between the actuator and the shift fork and a sign which is generated by the cellular automaton and is assigned to the particular shift request.

The previous method for mechanical play correction assumes that the end position of the actuator in the non-energized state can be a priority determined. Since the system is also subjected to external forces in this end state, once the target position, which has been determined in this way, has been reached, the actuator moves further, even if the H-bridge of the motor control of the actuator is deactivated. As a result, the objective of mechanically releasing the sliding blocks in the gearshift sleeve is not met.

Forces act on the rotor due to the magnetic restoring force of the stator caused by the torque ripple of the electric motor, a BLDC motor; as a result, the stator always pulls the rotor into discrete rotor positions distributed over the circumference, depending on the number of pole pairs. This effect acts directly on the rotor and, therefore, sets in immediately after the holding current is switched off.

Due to the flexing motion of the teeth, the gearshift sleeve can be axially displaced in certain operating ranges. This effect acts indirectly and with delay, since the entirety of the actuator play must be used up before the rotor is moved.

One problem addressed by the invention is to provide a method which minimizes a movement of a shift fork and thus of the rotor of the actuator.

SUMMARY OF THE INVENTION

This section provides a general summary of the disclosure, and is not a comprehensive disclosure of its full scope or all of its features.

The problem is solved by a method for the dynamically expanding play correction according to a method for hysteresis compensation for an actuator and for a shift fork which is movable by this actuator via an electric motor having a rotor and a stator and which guides a gearshift sleeve, by means of a cellular automaton, wherein a torque ripple of the actuator and a mechanical displacement of the gearshift sleeve are compensated independently of one another or in combination by means of a learning algorithm.

The time sequence is such that, initially, hysteresis is compensated and only once this hysteresis compensation has generated results, the further compensation method for the torque ripple and/or for the mechanical displacement is started.

The compensation is carried out only for the torque ripple of the actuator or only for the mechanical effects on the gearshift sleeve. The compensation can, via the learning algorithm, also detect both processes in parallel, however, and adjust the target position of the gearshift sleeve, combining both methods.

Due to the fact that the gearshift sleeve is always released from contact with the sliding block, wear is minimized.

The method according to the invention easily allows for a mechanical play correction between an actuator and a shift fork which can be moved by this actuator. This yields the possibility of exactly positioning the shift fork, due to which the shift fork undergoes less wear over its service life. The method described above is generally a simple, highly flexible, versatile and robust approach for the functional closed-loop control of any type of play-exhibiting systems. Due to the method, the necessary component tolerances can be held in a range in which costs are acceptable without adversely affecting the positional accuracy.

The electric motor which is used, a BLDC motor, has preferred rotor positions. When there is a jump to an adjacent rotor position, a new target position is learned and, thereafter, the gearshift sleeve and the rotor are to be released with respect to each other.

The mechanically moving gearshift sleeve is adjusted up to an adjustment tolerance and, in this way, a new target position is determined. This adjustment process is limited by an end stop.

The hysteresis is compensated by means of a cellular automaton prior to the adaptive play correction, wherein the shift fork is moved by means of the actuator from a first shift position, namely a neutral position, into at least one second shift position, namely a gear position, and vice versa, wherein the position of the actuator is corrected when there is a shift request into the neutral position or into the gear position on the basis of a stored mechanical play between the actuator and the shift fork and a sign which is generated by the cellular automaton and is assigned to the particular shift request.

After the shift fork is actuated into the particular shift position, the actuator is mechanically released, namely by controlling or adjusting the center of the mechanical play.

The actuator is controlled by an open-loop or closed-loop system via a control unit, wherein the control unit has, in addition to the cellular automaton, a software module which is designed to calculate a dynamic adaptation of the target position to the effects of the motor characteristics and external forces, in order to ensure the release of the gearshift sleeve.

The invention includes learning the angles at which the rotor is drawn in due to the torque ripple effect and specifying these positions in advance as target positions in a certain target range. The movement of the rotor resulting from the moving gearshift sleeve must be detected in order to appropriately release the gearshift sleeve again.

As a result, the two effects can be addressed separately, since they arise at different points in time.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DESCRIPTION OF THE INVENTION

Figure 1:
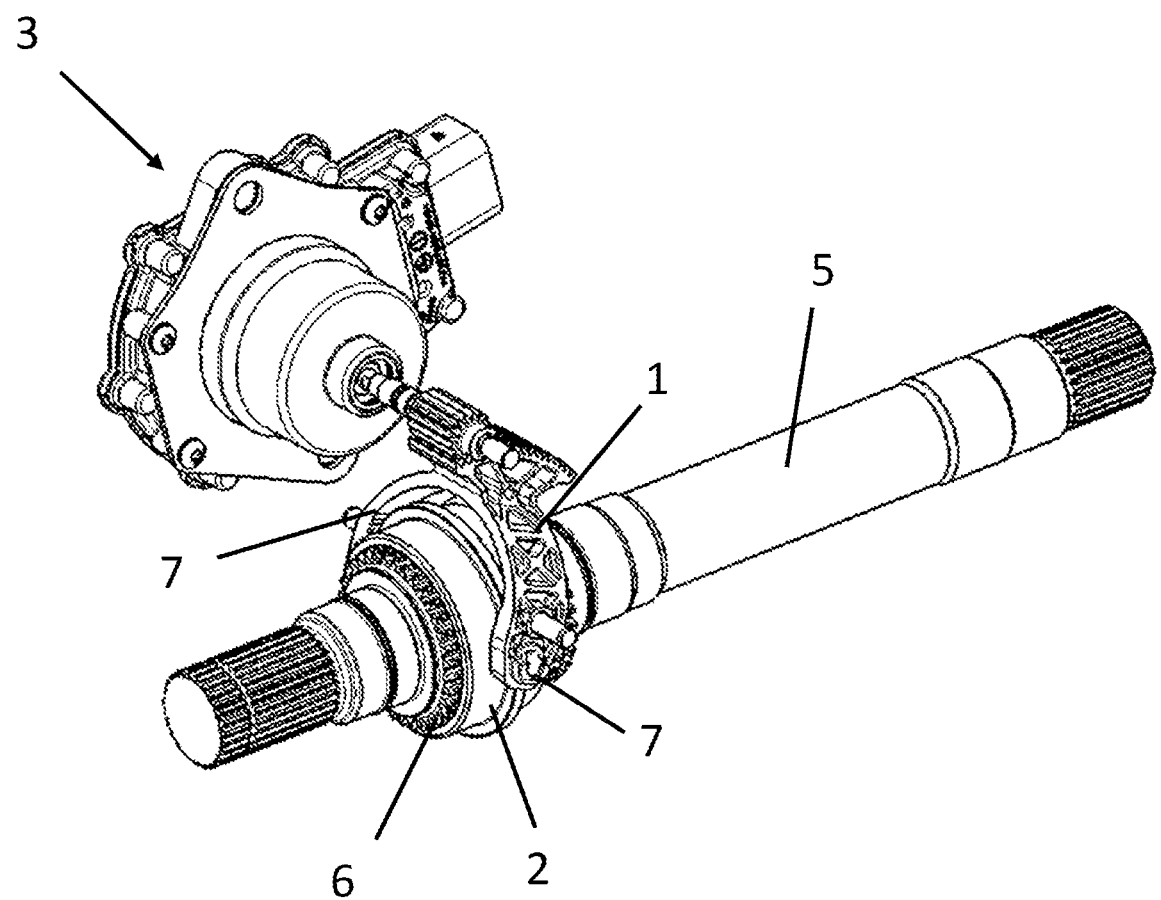
FIG. 1 shows an isometric view of a shift fork and a gearshift sleeve.

The method according to the invention is used to set a target position of a shift fork 1 and for hysteresis compensation for an actuator 3 and the shift fork 1 which guides a gearshift sleeve 2, see FIG. 1, the shift fork 1 being movable via the actuator 3. By means of the gearshift sleeve 2, a gear is engaged in the transmission by means of a form-locking connection between teeth 6 on an input shaft 5 and the particular gear wheel of the gear step. The shift fork 1 is actuated via the actuator 3 and carries the gearshift sleeve 2 along and engages the gear. Sliding blocks 7 are arranged in the contact area with the teeth 6. The shift fork 1 can be moved by means of the actuator 3 into two different shift positions, namely a first shift position xDecoup and a second shift position xCoup. The first shift position xDecoup of the shift fork 1 corresponds to a neutral position and the second shift position xCoup corresponds to a gear position.

The actuator 3 can be actuated for this purpose into a first position phiDecoup, which results in a movement of the shift fork 1 into the first shift position xDecoup. In addition, the actuator 3 can be actuated into a second position phiCoup, which results in a movement of the shift fork 1 into the second shift position xCoup.

If the shift fork 1 is in a shift position xCoup, xDecoup, it is mechanically released via a mechanical release of the actuator 3.

Figures 2, 3:
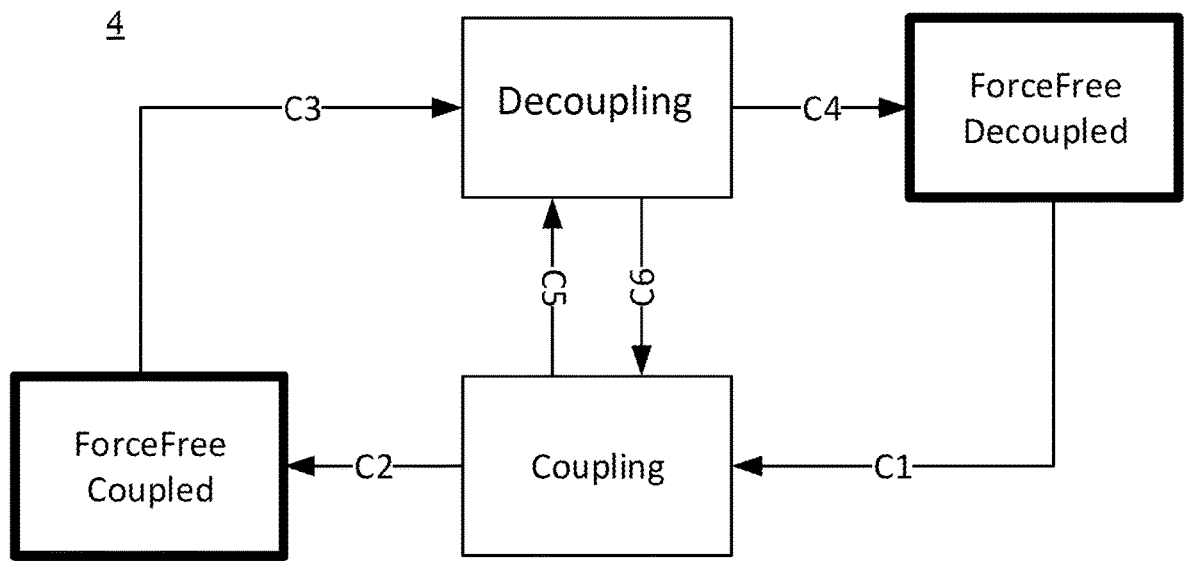
FIG. 2 shows a schematic view of a cellular automaton.
FIG. 3 shows a table with target positions of a shift fork, their status assignments and signs therefor, the signs being stored in a cellular automaton.

The actuator 3 is controlled by an open-loop or closed-loop system via a control unit (not shown) which includes a cellular automaton 4, see FIG. 2.

The particular status of the system, i.e., the particular shift position xCoup, xDecoup of the shift fork 1, is depicted by the cellular automaton 4, which determines a correction of the position specification for the actuator 3 on the basis of its current status and its future status.

Figure 4:
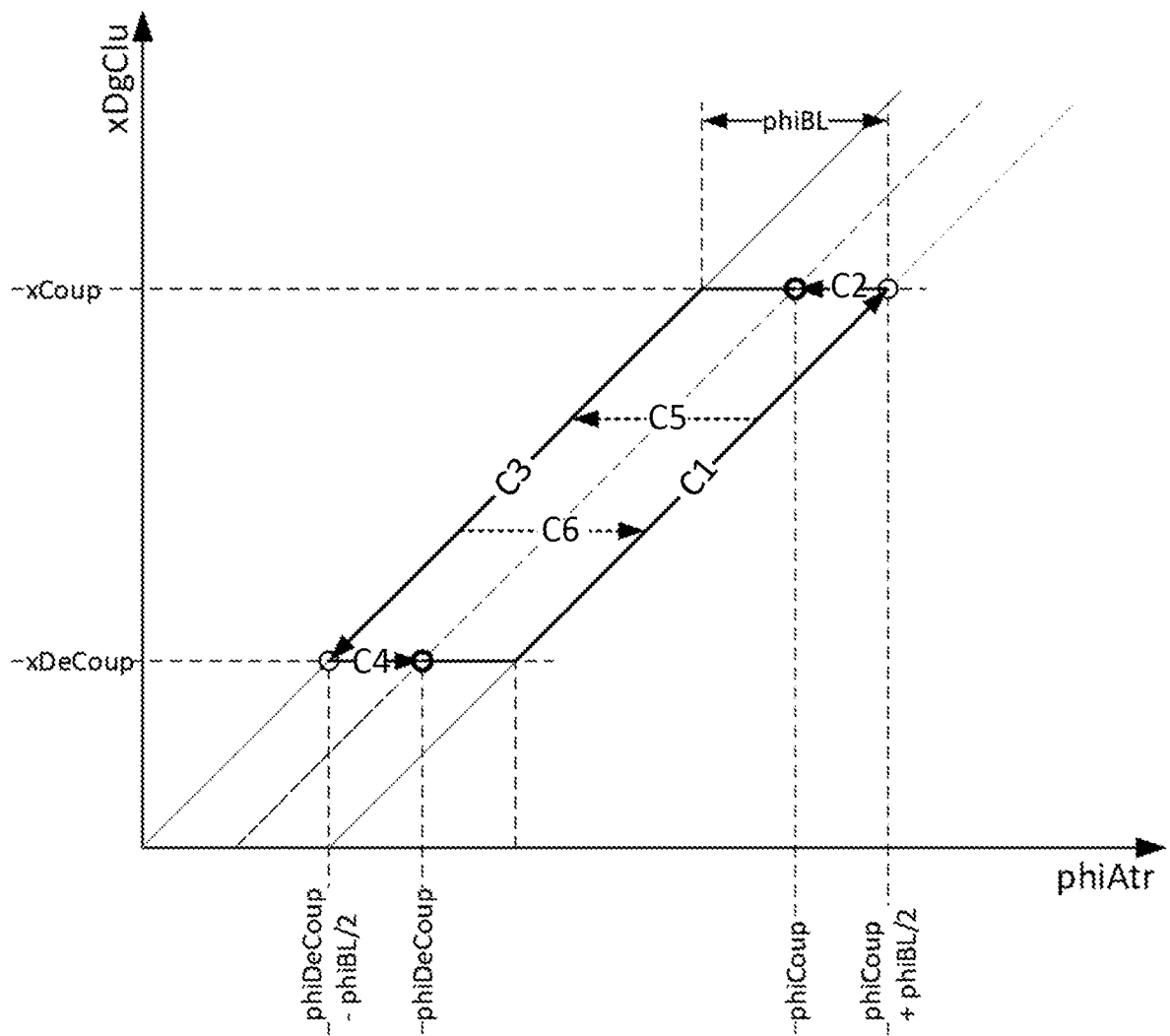
FIG. 4 shows a diagram illustrating the hysteresis of an actuator, wherein a position of the actuator is plotted on the x-axis and the shift position of a shift fork or of a gearshift sleeve is plotted on the y-axis.

A nonlinear system is assumed, in which the actuator 3 is to exactly position the shift fork 1, even though it has mechanical play phiBL (FIG. 4). In the diagram in FIG. 4, a shift position of the shift fork xDgClu (y-axis) is plotted with respect to a position of the actuator phiAtr (x-axis).

A movement of the shift fork 1 into the first shift position xDecoup is brought about via the actuation of the actuator 3 into the first position phiDecoup. A movement of the shift fork 1 into the second shift position xCoup is brought about via the actuation of the actuator 3 into the second position phiCoup. The shift fork 1 must be positioned exactly at the first shift position xDecoup, i.e., the neutral position, and at the second shift position xCoup, namely the gear position. Thereafter, the actuator 3 is mechanically released, i.e., moved into the center of the mechanical play phiBL. The particular position of the actuator 3 is described by the value phiAtr (FIG. 4; x-axis). The target position phiAtrReq for the actuator 3 can therefore be formulated as follows, see FIG. 4.

$$phiAtrReq = phiTarget + signBL * phiBL/2$$

wherein phiTarget=phiDeCoup or phiCoup, i.e., the first position phiDecoup or the second position phiCoup of the actuator 3, depending on the shift request. A sign signBL is generated by the cellular automaton 4 and can have the values +1, 0 and −1.

For the exemplary description of the sequence of the method, a load-free decoupled state is assumed, with the actuator 3 released (FIG. 2, "ForceFree Decoupled"). If a shift request (FIG. 2, FIG. 4, step C1) is detected, the cell automaton 4 switches into the Coupling status and thus establishes the desired position, namely phiTarget=phiCoup, and the associated sign, namely signBL=+1 (FIG. 3). If the desired position of the actuator 3 has been attained, the release of the actuator 3 and thus of the shift fork 1 can be started (FIG. 2, FIG. 4, step C2) until phiTarget=phiCoup with the sign signBL=0 (FIG. 2, "ForceFree Coupled"). If a shift request toward disengagement (FIG. 2, FIG. 4, step C3) is then detected, the cell automaton 4 switches into the status Decoupling and establishes the desired position, namely phiTarget=phiDecoup, and the associated sign, namely signBL=−1. Once the target position has been reached, the actuator 3 and thus the shift fork 1 are released again, namely until phiTarget=phiDecoup with the sign signBL=0 (FIG. 2, "ForceFree Decoupled"). The gear change can be aborted (FIG. 2, FIG. 4, steps C5 and C6) at any time. The play is always passed through correctly. If further system states arise, it is only necessary to add the target position and the associated sign in the table. In this way, the hysteresis curve (FIG. 4) is always passed through correctly, and the exact position of the shift fork 1 can be determined at any time.

After the compensation of the arising hysteresis, in order to also compensate for the effects due to torque ripple and mechanical displacement, the control unit includes, in addition to the cellular automaton, a software module which is designed to calculate a dynamic adaptation of the target position to the effects of the motor characteristics and external forces, in order to ensure the release of the gearshift sleeve 2.

In order to determine the correct target position phiTarget_e, which is matched to the discrete stop points, a learning algorithm observes the course of the actuator angle phiAct over time directly after adjustment of the unlearned target position phiActReq, after the holding current is switched off. This is apparent in the first step S51 in FIG. 5. The system has discrete possible rotor positions as angular positions of the actuator 2, between which the indicated gearshift sleeve 2 and the indicated sliding blocks 7 are located. In step S52, the rotor jumps to one of the possible rotor positions due to the torque ripple, and so the shift fork 1 rests via the sliding block 7, which is fixedly connected to the rotor, against the gearshift sleeve 2.

The position of the gearshift sleeve 2, which then sets in within the first holding phase of the step S52, is learned as a new target position in step S53. This learning takes place for the coupled status and for the decoupled status. Therefore, the new target position phiTarget_e has been established for the next coupling process.

Figure 5:
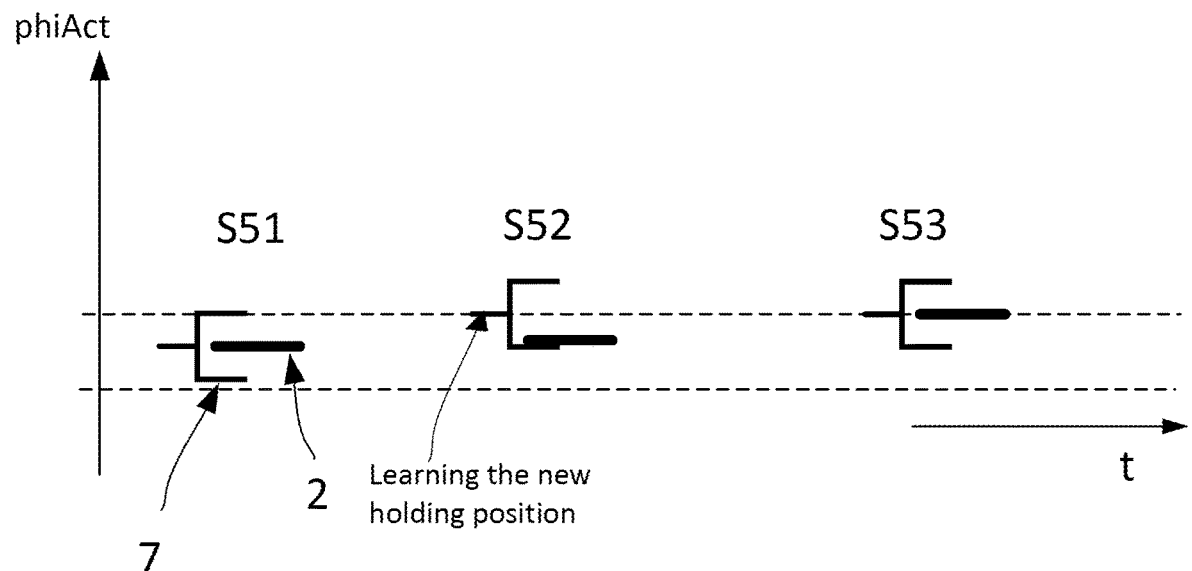
FIG. 5 shows the sequence for learning an adapted target position.
Figure 6:
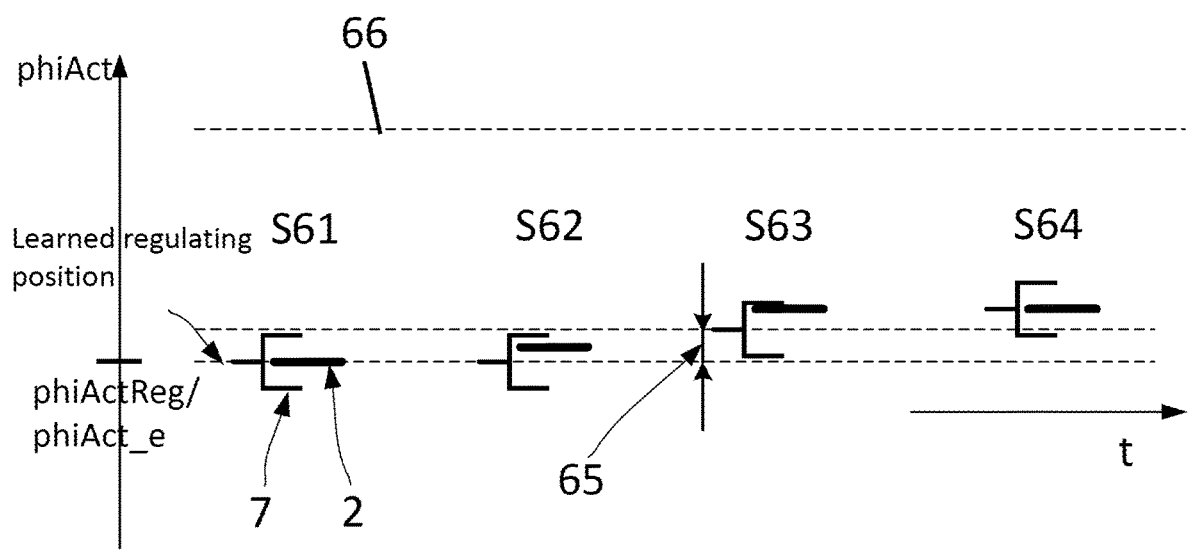
FIG. 6 shows the sequence for releasing the gearshift sleeve during mechanical movement.

In order to respond to a passively moving gearshift sleeve 2 and release it again, the actuator angle is to be further observed in the coupled status after the stop-point learning algorithm according to FIG. 5 has ended. Proceeding from the overall adjustment position phiAct_e, the sliding block 7 and the gearshift sleeve 2 are not in contact in step S61. In step S62, the gearshift sleeve 2 begins to move, and so the angle of rotation also changes. Above the initial position, the adjustment position phiAct_e, a position is established which is determined by an adjustment tolerance 65. In step S63, the moving gearshift sleeve 2 carries the sliding block 7 along until the position established by the adjustment tolerance 65 has been reached. Thereafter, in step S64, a new release position for the shift fork 1 or the sliding blocks 7 is established. The gearshift sleeve 2 moves passively (due to the flexing movement of the toothed half shafts). In order to compensate therefor, the sliding blocks 7, which are mounted in the shift fork 1, which is swiveled by the actuator motor, must follow this change in position and, in addition, release again. The movement is limited by an upper correction limit which corresponds to an end stop 66.

Therefore, if the angular position of the actuator 3 changes even though there is no current present, the gearshift sleeve 2 is to be made contact-free again after the adjustment tolerance 65 has been exceeded.

Since the gearshift sleeve 2 is always released, due to a dynamic adaptation of the target position to the effects of external forces, there is reduced wear between the sliding block 7 and the gearshift sleeve 2 and, as a result, reduced wear and a longer service life.

It would be possible to determine the new target position phiAct_e only in one of the two states, coupled or decoupled, and then calculate back to the target position in the particular other state on the basis of the angular difference of the pole pair.

What is claimed is:

1. A method for dynamically expanding mechanical play correction according to a method for hysteresis compensation for an actuator and for a shift fork which is movable by the actuator via an electric motor having a rotor and a stator and which guides a gearshift sleeve, comprising:
   controlling the actuator by an open-loop or closed-loop system via a control unit including a cellular automaton, and using a learning algorithm to observe and compensate a course of actuator angle and torque ripple of the actuator and an associated mechanical displacement of the gearshift sleeve independently of one another or in combination.

2. The method according to claim 1, wherein the electric motor has preferred rotor positions such that when there is a jump to an adjacent rotor position, a new target position is learned by the learning algorithm, the gearshift sleeve and the rotor are released with respect to each other.

3. The method according to claim 1, wherein, when the gearshift sleeve is moving, an adjustment is made up to an adjustment tolerance and, in this way, a new target position is determined by the learning algorithm.

4. The method according to claim 3, wherein the adjustment tolerance is limited by an end stop.

5. The method according to claim 1, wherein the hysteresis is compensated by the cellular automaton prior to the mechanical play correction, wherein the shift fork is moved by the actuator from a first shift position, namely a neutral position, into at least one second shift position, namely a gear position, and vice versa, wherein the position of the actuator is corrected when there is a shift request into the neutral position or into the gear position on the basis of a stored mechanical play between the actuator and the shift fork and a sign (+1, 0, −1) which is generated by the cellular automaton and is assigned to the particular shift request.

6. The method according to claim 5, characterized in that, after the shift fork is actuated into the particular shift position, the actuator is mechanically released, namely controlled by the open-loop or closed-loop system, into the center of the mechanical play.

7. The method according to claim 5, wherein the control unit has, in addition to the cellular automaton, a software module which is designed to calculate a dynamic adaptation of the target position to the effects of the motor characteristics.

* * * * *